United States Patent
Hiatt et al.

(12) 
(10) Patent No.: US 6,733,672 B2
(45) Date of Patent: May 11, 2004

(54) SYSTEM AND METHOD FOR THE TREATMENT OF SOOT-LADEN WATER

(75) Inventors: William C. Hiatt, Hendersonville, NC (US); James R. Brocato, Sparta, NJ (US); Olaf McDavid, Gonzales, LA (US); Murthy S. Duvvuri, Prairieville, LA (US); Donald O. Lierman, Baton Rouge, LA (US); Uwe Wegmann, Mannheim (DE); Peter Paessler, Ludwigshafen (DE)

(73) Assignee: BASF Corporation, Mt. Olive, NJ (US)

( * ) Notice: Subject to any disclaimer, the term of this patent is extended or adjusted under 35 U.S.C. 154(b) by 181 days.

(21) Appl. No.: 10/039,829

(22) Filed: Oct. 19, 2001

(65) Prior Publication Data

US 2003/0080052 A1 May 1, 2003

(51) Int. Cl.[7] .................................................. C02F 3/00
(52) U.S. Cl. ..................... 210/609; 210/631; 210/735; 210/723; 210/626
(58) Field of Search ........................ 210/601, 615–618, 210/620–631, 723, 735

(56) References Cited

U.S. PATENT DOCUMENTS

| | | | |
|---|---|---|---|
| 4,197,597 A | * | 4/1980 | Toms .............................. 4/300 |
| 4,642,187 A | * | 2/1987 | Schimel ....................... 210/258 |
| 4,917,805 A | | 4/1990 | Reid ............................ 210/605 |
| 5,073,271 A | * | 12/1991 | Sander et al. ................ 210/710 |
| 5,094,752 A | * | 3/1992 | Davis et al. .................. 210/614 |
| 5,106,496 A | * | 4/1992 | Cournoyer et al. .......... 210/188 |
| 5,611,927 A | | 3/1997 | Schmid ........................ 210/605 |
| 5,626,754 A | | 5/1997 | Ballnus ....................... 210/605 |
| 5,626,755 A | | 5/1997 | Keyser et al. ............... 210/614 |
| 5,628,911 A | * | 5/1997 | Kowallik et al. ........... 210/710 |
| 5,670,061 A | * | 9/1997 | Kowallik et al. ........... 210/771 |
| 5,811,009 A | * | 9/1998 | Kos .............................. 210/605 |
| 6,254,778 B1 | | 7/2001 | Chudoba et al. ............ 210/614 |

FOREIGN PATENT DOCUMENTS

| | | | |
|---|---|---|---|
| DE | 3501585 A1 | 8/1985 | ............ C02F/3/12 |
| DE | 244970 A1 | 4/1987 | ........... C02F/11/12 |
| DE | 3915026 A1 | 11/1989 | ............ C02F/3/30 |
| FR | 2741872 A1 | 6/1997 | ............ C02F/3/10 |
| WO | WO9000158 | 1/1990 | ............ C02F/3/02 |
| WO | WO9629290 | 9/1996 | ............ C02F/3/30 |

* cited by examiner

*Primary Examiner*—Chester T Barry
(74) *Attorney, Agent, or Firm*—Fernando A. Borrego

(57) ABSTRACT

A system and method for treatment of soot-laden waste water is disclosed. The method comprises the steps of separating the soot from the waste water initially in a clarifier. The concentrated soot is then treated with an activated sludge mixture in a digester with a very long average hydraulic retention time to effectively digest the materials found in the concentrated soot. Soot-free waste water is treated via standard aerobic, and anoxic reactor basins and a clarifier with activated sludge recirculation. The system effectively removes soot from soot-laden waste water in a cost effective manner.

11 Claims, 1 Drawing Sheet

SYSTEM AND METHOD FOR THE TREATMENT OF SOOT-LADEN WATER

BACKGROUND OF THE INVENTION

The invention relates to a system and method for treatment of soot-laden water in a continuous flow completely mixed waste water treatment reactor system.

Controlling biological waste water treatment processing in the chemical industry requires balancing many competing elements. The waste water of the chemical industry frequently contains high levels of organic carbon, ammonia and nitrates. Thus the treatment procedure may require the simultaneous removal of organic carbon, ammonia, nitrates and other priority pollutants by a combination of nitrification and denitrification. The processing to form acetylene generates two complex waste water streams comprising a soot-containing waste water stream and an other process waste water stream. The soot-containing stream comprises very fine dispersed carbon particles and organic compounds such as, for example, benzene, toluene, and other volatile organic compounds in the water.

Nitrification, the biological oxidation of ammonia to nitrates by autotrophic bacteria, is typically utilized to remove ammonia from waste water. This process thus generates additional nitrates as the ammonia is oxidized. These autotrophic bacteria generally use carbon dioxide as a carbon source during the nitrification reaction. The nitrification is a sensitive process and requires, for example, prescribed temperatures, a specific pH range, and an aerobic environment with a dissolved oxygen content of generally more than 2 mg $O_2$/L. In addition, excessive amounts of inhibitory compounds such as salts, certain amines, and other compounds must be avoided. Another requirement is a long Solids Retention Time (SRT), which means a balance of moderate organic carbon levels in proportion to ammonia, to allow the slowly growing autotrophic bacteria to complete with the faster growing heterotrophic bacteria found in the waste water.

Denitrification, the biological reduction of nitrates to nitrogen gas with the utilization of the organic carbon waste by heterotrophic bacteria, is typically used to remove nitrates and organic carbons from the waste water. The primary requirements for denitrification include an anoxic environment with a dissolved oxygen content of less than 0.5 mg $O_2$/L and adequate organic carbon substrate to balance the nitrate levels. Without adequate organic carbon, the heterotrophic bacteria can not reduce the nitrates. Thus, the dissolved oxygen requirements for nitrification and denitrification are mutually exclusive.

Several processes have been developed in an attempt to handle waste water having high levels of organic carbon, ammonia and nitrates using the nitrification and denitrification reactions. One process is a two sludge system that employs anoxic conditions with heterotrophic bacteria to consume organic carbon and reduce nitrates in a first bioreactor with solids recycling and a second independent bioreactor system under aerobic conditions to oxidize the ammonia. This process has the advantage of completely separating the nitrification and denitrification steps and is used where nitrates are present in the influent, but it is not able to denitrify the nitrates generated in the nitrification step. This inability can be a significant problem when the level of ammonia in the influent is high.

Another process employs a single sludge system with two or more bioreactors. In this process, anoxic conditions are maintained in one vessel to facilitate denitrification while aerobic conditions are maintained in another vessel (or vessels) to facilitate nitrification. This arrangement is suitable to consume nitrates present in the influent waste water, but also suffers from an inability to denitrify the generated nitrates from the oxidation of ammonia. One way to manage nitrification and denitrification in a single sludge process involves an internal recirculation step. This internal recirculation step is employed in the "Carousel" process, oxidation ditches and the Modified Ludzak-Ettinger (MLE) process. These processes function by creating different process conditions spatially within a single plug flow reactor, and recirculating generated nitrates from the aerobic zone to the anoxic zone. These modified methods are suitable for plug flow reactors treating waste water in which toxic overloads of chemicals are not an issue.

Treating the soot-laden waste stream produced by formation of acetylene in either of these conventional systems is very difficult. The large amount of inert solids present in the soot waste water will quickly reduce the capacity of these activated sludge systems. Physical separation of the carbon solids generates a hazardous waste issue due to the organic compounds adsorbed to the soot. Treatment of the waste water with activate carbon would be very expensive. Thus, there is a need to develop an efficient and cost effective system to treat soot-laden waste water, and preferably such a system could utilize a portion of existing waste water treatment systems.

SUMMARY OF THE INVENTION

In general terms, this invention provides a continuous flow completely mixed waste water treatment reactor system that is capable of treating a soot-laden waste water in a cost effective and efficient manner while maintaining continuous flow.

In one embodiment, the present invention comprises a method for treating soot-containing waste water comprising the steps of: adding at least one of a surfactant or a flocculating agent to a soot-containing waste water stream and then flowing the soot-containing waste water stream into a clarifier; settling the soot from the waste water in the clarifier to form a settled soot; flowing the settled soot from the clarifier into a first reactor basin having an average hydraulic retention time of at least 120 hours; adding to the first reactor basin an activated sludge; and degrading the settled soot in the first reactor basin.

In another embodiment, the present invention is a reactor system for treating soot-containing waste water and comprises a soot clarifier in communication with a soot-containing waste water stream; a first reactor basin having an average hydraulic retention time of at least 120 hours in communication with the soot clarifier for receiving a settled soot from the clarifier and having a mixed liquor therein; and an activated sludge input to the first reactor basin.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
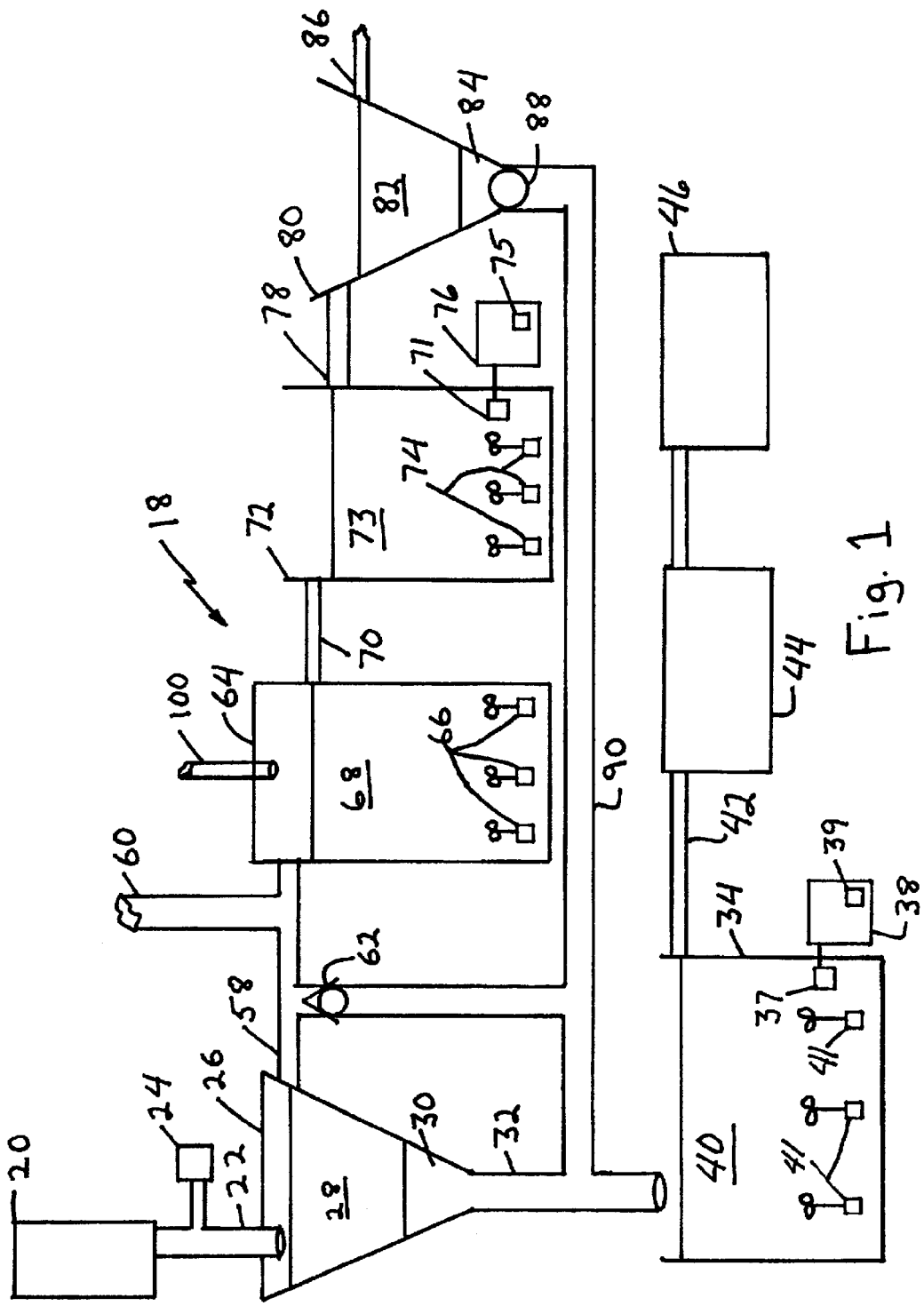
FIG. 1 is a schematic drawing of a continuous flow completely mixed waste water treatment system according to the present invention.

In FIG. 1, a continuous flow completely mixed waste water treatment reactor system designed according to the present invention is generally shown at 18. The reactor system 18 comprises: a soot clarifier 26, a first reactor basin 34, an anoxic reactor basin 64, a second aerobic reactor basin 72, and a final clarifier 80. An acetylene reactor 20 is used to produce acetylene. The process produces a soot-laden waste water stream that is sent by a soot waste line 22 to a soot clarifier 26. Both the soot waste line 22 and soot clarifier 26 are contained to eliminate air emissions. Because the soot is very hydrophobic, a surfactant material or a mixture of surfactant and flocculating agent 24 are added to the soot waste line 22 to mix with the soot and thereby reduce the hydrophobicity of the soot. Typical surfactants are polyacrylamides, polyamines, non-ionic surfactants like alkoxylated alcohols, and anionic polymeric flocculating agents. Specific examples of the alkoxylated alcohols include the Plurafac® series available from BASF Corporation. Suitable polymeric flocculating agents include the Polyfloc series from BetzDearbom, a high molecular weight, low charge density anionic polymer.

The soot clarifier 26 is a dedicated clarifier that receives the soot waste water from the acetylene reactor 20 and maintains a fairly constant level of waste water 28. The soot within the waste water 28 settles to the bottom of the clarifier 26 and forms a settled soot layer 30. The settled soot 30 is carried by a soot line 32 into a first reactor basin 34. The soot line 32 also receives input from an activated sludge line 90, discussed further below.

The first reactor basin 34 may be an aerobic reactor basin, an anoxic reactor basin, or an anaerobic reactor basin. As is understood by those of skill in the art, an aerobic reactor basin uses oxygen as the electron acceptor, the anoxic reactor basin uses nitrate as the electron acceptor, and the anaerobic reactor basin is more of a fermentation process without use of oxygen or nitrate. The first reactor basin 34 could be either an aerobic or an anoxic reactor basin. When the first reactor basin 34 is an aerobic type then it includes an oxygen sensor and input 37 that is connected to an oxygen source 38 and controller 39. The oxygen sensor and input 37 and oxygen source 38 and controller 39 serve to maintain and monitor the oxygen level within the first reactor basin 34. If the first reactor basin 34 is run as an anoxic reactor basin, the oxygen input is not necessary. When run as an anoxic reactor, as would be understood by one of ordinary skill in the art, the first reactor basin 34 does not use oxygen sensors and input 37. Preferably, this input 37 is replaced by an oxidation/reduction potential sensor. The first reactor basin 34 contains a mixed liquor 40 and further includes a plurality of mixers 41 to ensure complete and thorough mixing of the contents of reactor basin 34. An effluent line 42 leads from the first reactor basin 34 to a dewatering system 44. The dewatering system 44 is used to remove water from the digested waste leaving the first reactor basin 34 and may include a belt press, centrifuge, or other well known in the art dewatering systems. From the dewatering system 44 the now solid waste is taken to a disposal unit 46. Alternatively, the material produced in the dewatering system 44 can be further dried into cake-like forms and then taken to the disposal unit 46, as is known in the art.

Generally, the amount of surfactant or flocculating agent 24 used is at a level of from 10 to 15 ppm, depending on the identity of the compound utilized. The input to the clarifier 26 will obviously depend on the production rate of the acetylene reactor 20. Likewise, the size of the soot clarifier 26 and the first reactor basin 34 are dependent on the rate of input from the acetylene reactor 20. For example, an input to the clarifier 26 of 150,000 gallons per day could be serviced by a clarifier 26 having a size of approximately 10,000 gallons. Typically, the settling velocity of the soot in the soot clarifier 26 is at least 2.5 meters per hour or greater. Preferably, the settling velocity is at least 3.0 meters per hour. Typically, the settled soot 30 is between 3 to 8% solids. The combined flow from the clarifier 26 and the activated sludge line 90 into the first reactor basin 34 must be less than or equal to 50% weight/volume in solids. With an input to the clarifier 26 of 150,000 gallons per day, the first reactor basin 34 can receive approximately 15,000 gallons per day from the soot clarifier 26 with an additional 30 to 45 gallons per minute from the activated sludge line 90 if the first reactor basin 34 has a volume of approximately 300,000 gallons.

The oxygen sensor and input 37 may comprise a plurality of aerators located throughout the basin as would be understood by one of ordinary skill in the art. Such aerators are well known and may be any of several types including floating aerators, platforms and combined jet aerators/mixers. As would be understood by one of ordinary skill in the art, the oxygen source 38 may comprise pure oxygen or an air mixture. The controller 39 controls input of oxygen from the oxygen source 38 to first reactor basin 34. Preferably, the dissolved oxygen level in the first reactor basin 34 is maintained at a level of between 1.0 to 5.0 mg/L to create an aerobic environment. The level of dissolved oxygen may go up to 10 to 15 mg/L at times.

In a typical reactor system 18, there will be also be monitoring of the pH of the reactor basins 34, 64, and 72. Buffering will be utilized to maintain the pH in an appropriate range of from between about 6.5 to 8.0. The nitrification reaction by autotrophic organisms tends to lower the pH and the denitrification by heterotrophic organisms tends to raise the pH. The reactor system 18 may further include monitoring equipment for monitoring the levels of organic carbon, nitrates, and ammonia in all of the reactor basins 34, 64, and 72.

In Table 1 the levels of several components in a typical soot waste water stream from an acetylene reactor 20 are reported.

TABLE 1

| Component | Amount in ppm |
|---|---|
| Total Organic Carbon, dissolved | 250.0 |
| Solids | 3,000.0 |
| Benzene | 0.5 |
| Toluene | 0.2 |
| Other Volatile Organic Compounds | 70.0 |

The first reactor basin 34 is a very long retention time bioreactor without solids recycling. Thus, the heavy solids load caused by the soot-laden water will not be put back into the system 18 where it could rapidly degrade the performance characteristics of the system 18. The average hydraulic residence time in the first reactor basin 34 is equal to or greater than 120 hours.

The overflow waster water 28 from the soot clarifier 26, which is now soot free, is carried by a soot clarifier effluent line 58 to the anoxic reactor basin 64. The system 18 can further include another waste water influent line 60 in connection with the soot clarifier effluent line 58. A one-way valve 62 connects an activated sludge line 90 to the soot clarifier effluent line 58. Anoxic reactor basin 64 is well known in the art and generally comprises a plurality of mixers 66 and a mixed liquor 68. Anoxic reactor basin 64 may further include a supplemental carbon input line 100 for optimizing the digestion of contaminants. The supplemental carbons are known in the art and may include, for example, methanol, ethylene glycol, and simple sugars. Typically, the dissolved oxygen level in the anoxic reactor basin 64 is at a level equal to or below 0.5 mg/L, thus creating an anoxic environment.

Outflow from the anoxic reactor basin 64 is carried via a line 70 to the second aerobic reactor basin 72. Second aerobic reactor basin 72 comprises a mixed liquor 73, an oxygen sensor/input 71, and a plurality of mixers 74. An oxygen source 76 and controller 75 are connected to the oxygen sensor/input 71 to maintain the oxygen level within the second aerobic reactor basin 72 at a level of greater than or equal to 1.0 mg/L, as discussed above for first reactor basin 34. An effluent line 78 carries mixed liquor 73 from second aerobic reactor basin 72 to the final clarifier 80. Final clarifier 80 contains waste water 82 and a sludge 84. Continuously, clarified effluent flows out of an effluent line 86 to a discharge stream where it can be recirculated for other uses. The system 18 may include farther additional purification steps beyond the clarifier 80 such as, for example, a sand filter or additional filtering. Periodically or continuously, the sludge 84 is removed from the clarifier 80 through a pump 88 with a valve (not shown). The pump 88 pumps the sludge 84 through a pair of sludge return lines 90 into the soot clarifier effluent line 58 and the soot line 32.

As would be understood by one of ordinary skill in the art, it is not necessary that reactor basin 64 be anoxic and basin 72 be aerobic. The system 18 could function with two aerobic reactor basins or utilize a single reactor basin. The system 18 shown in FIG. 1 is just illustrative of one embodiment.

The reactor system 18 is a continuous flow system. In Table 2, below, the efficiency of the soot clarifier 26 is reported.

TABLE 2

| Component | Influent Level | Clarifier Supernatant | Settled Soot |
|---|---|---|---|
| Total Organic Carbon, dissolved ppm | 250.0 | 250.0 | 250.0 |
| Solids, percent | 0.3 | 0.0 | 3.0 |
| Benzene, ppm | 0.4 | 0.2 | 1.0 |
| Toluene, ppm | 0.2 | 0.1 | 2.0 |
| Other Volatile Organic Compounds, ppm | 70.0 | 55.0 | 200.0 |

Thus, it can be seen that the soot clarifier 26 effectively removes the solids and soot from the soot waste water and concentrates the benzene, toluene, and other volatile organic compounds. The efficiency of the first reactor basin 34 when using it as an aerobic reactor basin was demonstrated by performing the well known Toxic Characteristic leaching Potential test (TCLP) on digested soot/biosludge mixture after 5 days of retention time in the first reactor basin 34. The TCLP test is performed according to test method 1311 in "Test Methods for Evaluating Solid Waste, Physical/Chemical Methods", EPA Publication SW-846 as referenced in 40 Code of Federal Regulations §260.11. Only very minor amounts of benzene could be detected within the digested soot/biosludge. Specifically, the amount of benzene in ppm's was 0.034 and the TCLP limit for benzene is 0.5 ppm. Thus, the first reactor basin 34 effectively digests the hazardous compounds from the concentrated soot 30.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A method for treating soot-containing waste water comprising the following steps:
    a) adding at least one of a surfactant or a flocculating agent to a soot-containing waste water stream and then flowing the soot-containing waste water stream into a clarifier;
    b) settling the soot from the waste water in the clarifier to form a settled soot;
    c) flowing the settled soot from the clarifier into a first reactor basin;
    d) adding to the first reactor an activated sludge; and
    e) degrading the settled soot in the first reactor basin for at least 120 hours.

2. The method as recited in claim 1 wherein step a) comprises adding at least one of a polyamine, a polyamide, an alkoxylated alcohol, or an anionic polymer to the soot-containing waste water stream.

3. The method as recited in claim 1 wherein step a) further comprises adding from 10 to 15 parts per million of the at least one of a surfactant or a floeculating agent to the soot-containing waste water stream.

4. The method as recited in claim 1 wherein step b) further comprises settling the soot at a rate of at least 2.5 meters per hour in the clarifier.

5. The method as recited in claim 1 wherein step b) further comprises settling the soot to a concentration of from 3.0 to 8.0 weight percent solids.

6. The method as recited in claim 1 wherein step c) further comprises flowing the settled soot from the clarifier into a first reactor basin maintained under aerobic conditions.

7. The method as recited in claim 6 comprising the further step of maintaining a dissolved oxygen concentration in the first reactor basin at or above 1.0 mg/L to maintain the aerobic conditions.

8. The method as recited in claim 7 comprising the further step of maintaining the dissolved oxygen concentration in the first reactor basin at from 1.0 to 15.0 mg/L.

9. The method as recited in claim 1 wherein after step e) the degraded settled soot is dewatered.

10. The method as recited in claim 9 wherein the degraded settled soot is dewatered using a belt press.

11. The method as recited in claim 9 wherein the degraded settled soot is centrifuged to dewater the degraded settled soot.

* * * * *